July 1, 1947.  F. P. BROWN  2,423,174
FISH HEADING MACHINE
Filed July 10, 1943  2 Sheets-Sheet 1
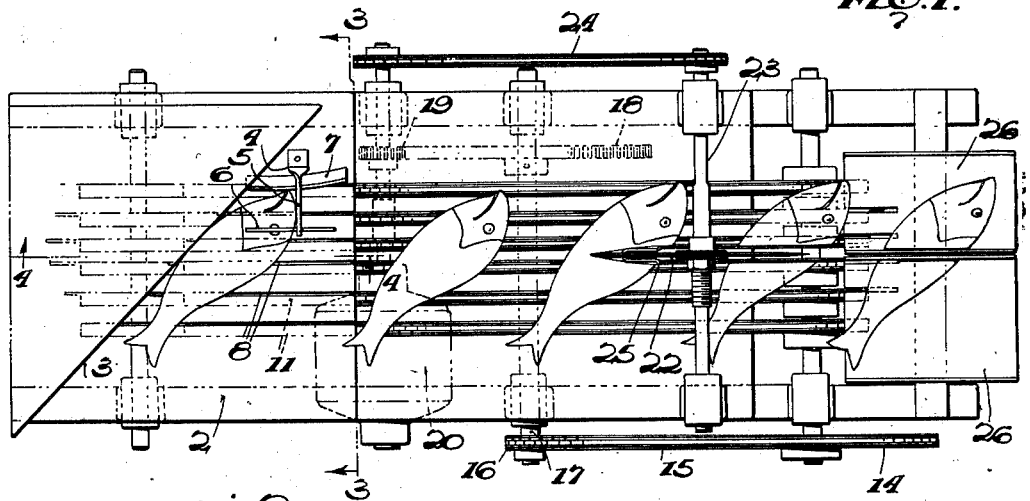
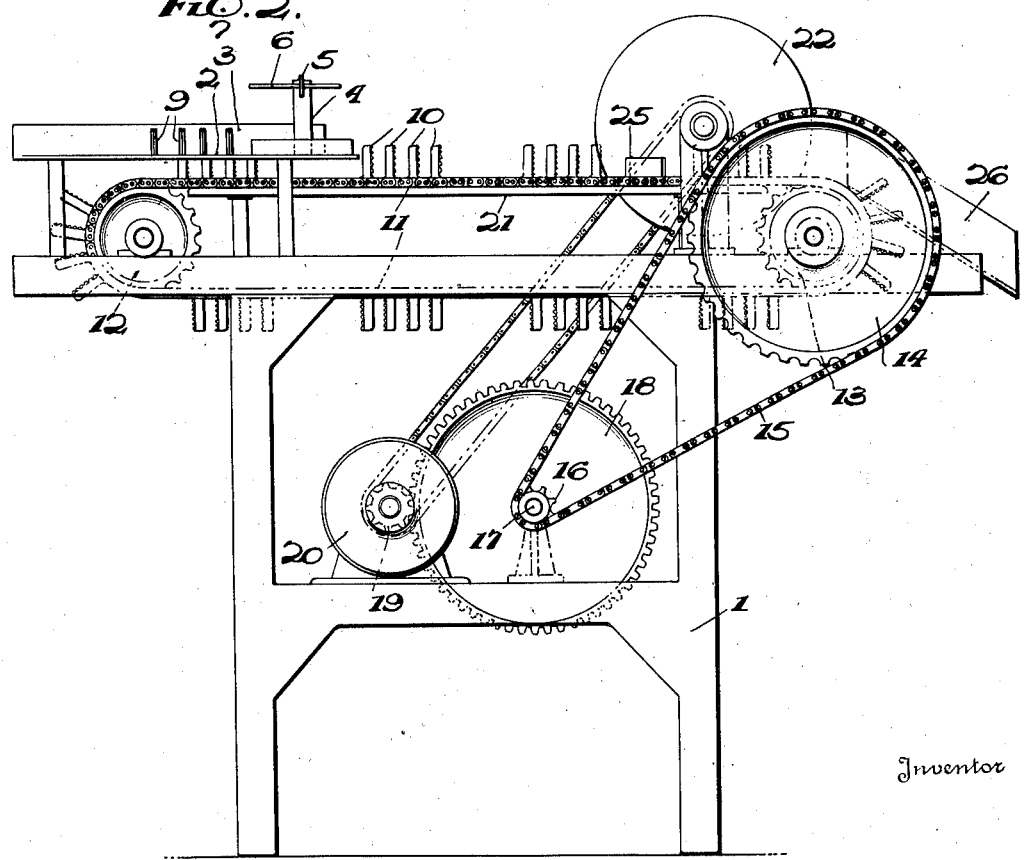
Inventor
Fred Parsons Brown
By Cameron, Kerkam + Sutton
Attorneys July 1, 1947.  F. P. BROWN  2,423,174
FISH HEADING MACHINE
Filed July 10, 1943  2 Sheets-Sheet 2
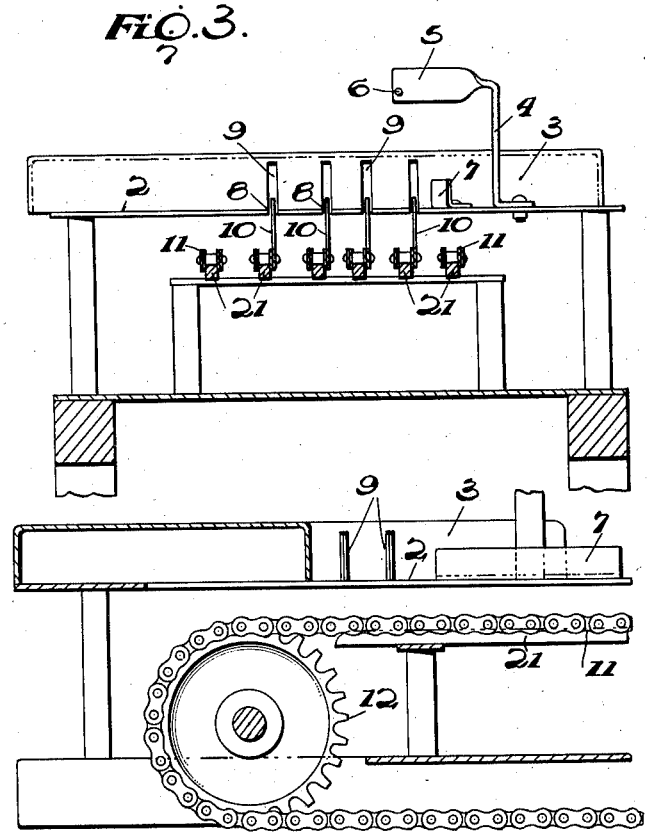
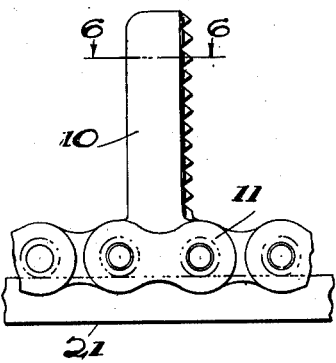
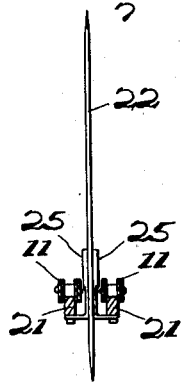
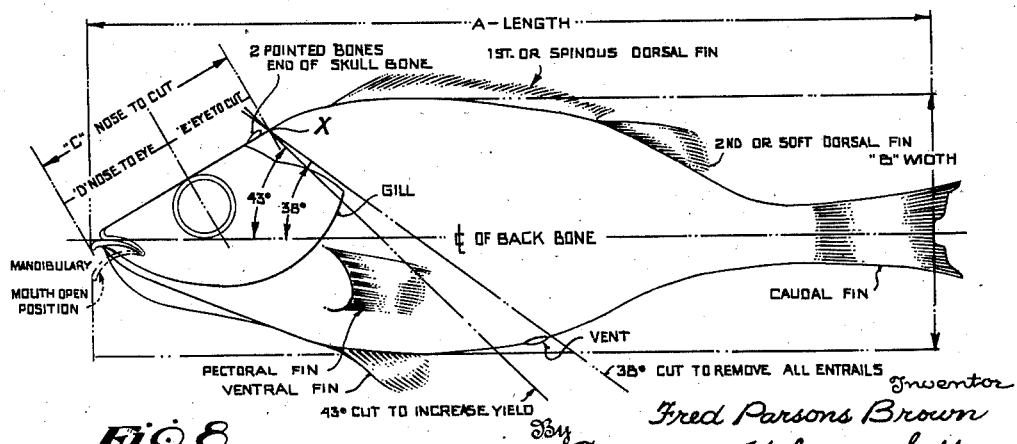

Patented July 1, 1947

2,423,174

UNITED STATES PATENT OFFICE 2,423,174

FISH HEADING MACHINE

Fred Parsons Brown, Braintree, Mass., assignor, by mesne assignments, to General Foods Corporation, New York, N. Y., a corporation of Delaware Application July 10, 1943, Serial No. 494,215

6 Claims. (Cl. 17—4)

This invention relates to fish dressing machinery and particularly to fish heading machines.

Various devices have been proposed heretofore in which, generally speaking, a fish is moved by suitable conveyors against a knife which severs the head of the fish from the body. In such devices the point at which the knife blade enters the body of the fish, as well as the angle of the cut with respect to the body of the fish, are important as determining on the one hand whether all desired waste material is removed and on the other hand whether useful material is removed and the yield thus decreased.

Usually the fish are placed manually on the machine at a point remote from the knife for safety reasons, and then carried to the knife by suitable conveyors. Hence the position of the fish can not be determined accurately with reference to the knife, and the operator is aided in loading the machine by a guide or stop for the nose of the fish. However, the size of the individual fish varies considerably, even in the same species, and there is a corresponding substantial variation in the distance from the nose to the point at which the cut should be made. Also the fish may have either closed or open mouths, thus introducing further variations in this distance. For a given setting of the stop, therefore, the fish in many cases are improperly cut. Either the waste material is not all removed, or the useful yield is decreased.

One of the objects of the present invention is to provide novel loading and locating means which enable the operator to place fish rapidly and easily on the machine in the correct position with respect to the cutting knife, thereby facilitating the loading of the machine and increasing the useful yield.

Another object is to provide novel means for locating the body of the fish to obtain substantially the proper cut regardless of variations in size of the individual fish.

A further object is to eliminate the use of gripping or piercing devices to hold the fish body as it moves toward the knife, at the same time providing a novel arrangement of loading and conveying means which minimizes the danger of shifting of the fish body with respect to the knife.

One embodiment of the invention has been illustrated in the accompanying drawings, but it is to be expressly understood that said drawings are for purposes of illustration only and are not to be taken as a definition of the limits of the invention, reference being had to the appended claims for this purpose.

In the drawings,

Fig. 1 is a plan view of a machine embodying the invention;

Fig. 2 is a side elevation of the machine shown in Fig. 1.

Fig. 3 is a section taken on the line 3—3 of Fig. 1;

Fig. 4 is a section taken on the line 4—4 of Fig. 1;

Fig. 5 is a detail view of part of the conveying means;

Fig. 6 is a section on the line 6—6 of Fig. 5;

Fig. 7 is a detail view of a suitable cutting knife; and

Fig. 8 is a diagram of a redfish which is used hereinafter to explain the invention.

Referring to Fig. 8, the cutting knife preferably enters the fish body at the point X just back of its skull bone and cuts through the fish at an angle which may vary within reasonable limits but which, in general, removes the head, gills, pectoral and ventral fins, etc. As stated above, the distance C from the nose of the fish to the point X varies substantially in individual fish and hence when the nose of the fish is used to locate the fish body, the results obtained are quite variable. I have found, however, that there is very little variation in the distance E from the eye of the fish to the point X, and in fact that for practical purposes this distance is substantially constant for fish of a given species, although they vary considerably in over-all size and weight. As shown by the following figures, based on a survey of a number of redfish, there is considerable variation in the length A, width B and weight of the fish, and as well in the distances C from the nose to the point X and D from the nose to the eye. Regardless of these variations, however, the distance E is substantially constant:

|  | A, Inches | B, Inches | Thickness, Inches | Weight, Ounces | C, Inches | D, Inches | E, Inches |
|---|---|---|---|---|---|---|---|
| Maximum | 11¾ | 4 | 2 | 19 | 3½ | 2 | 1½ |
| Minimum | 7½ | 2¼ | 1⅛ | 5½ | 2¼ | 1⅛ | 1 |
| Difference |  |  |  |  | 1⅜ |  | ½ |

From these figures it is seen that the distance C cannot be used efficiently without first grading the fish to uniform size. For example, if a nose stop is set correctly for the larger size, the point X would lie 1⅜" behind the skull bone in the case of the smaller size and the loss of useful flesh would be very large. Even with an average setting of the nose stop, the loss would nevertheless be too great in the case of small fish, while bone and other waste material would be left in the case of large fish.

The distance E, on the other hand, varies litle, even when the size of the individual fish varies greatly. Thus the eye of the fish, an easily visible mark, can be used to locate the fish for the proper cut substantially regardless of variations in size in the individual fish and unaffected by the conditions of their mouths. It will be understood that these relationships hold good for other species as well as redfish, although the distance E may differ between species.

Moreover, the fish body must be placed at an angle with respect to the knife such as to provide the desired cut. Referring again to Fig. 8, it will be seen that in the case of redfish the angle of the cut with respect to the backbone of the fish may vary between about 38° and 43°. The angle of 38° removes all entrails as in the case of so-called "round dressed" fish. Where the fish are to be filleted, however, the angle of 43° may be employed. A small black spot may be left on the inside of the fillet, but is readily removed in subsequent handling of the fillets, so that advantage may be taken of the larger angle to obtain an increased yield of about 6–8%. It will be understood again, however, that these angles may vary between different species.

In practice I prefer to employ a stationary substantially horizontal loading platform or table adjacent one end of the machine on which the fish are placed in succession by the operator. The desired angle of the fish body with respect to the knife is obtained by placing the belly of the fish against a vertical guide or stop wall projecting above the table top and inclined at the proper angle. Mounted on the table or on the machine adjacent thereto is a suitable device indicating the correct lateral position of the eye of the fish to obtain the correct starting point for cut. The angle of the stop wall and the position of the indicating device may be adjustable for different species of fish, but in a machine intended for use with only one species the capacity for such adjustment is ordinarily not required. The fish are then pushed off the table in succession onto a moving conveyor which carries them to the knife without disturbing the angle or lateral position of the fish body.

The drawings show a machine having the above characteristics and intended for use with redfish. It comprises a suitable frame 1 carrying adjacent one end thereof a horizontal loading platform or table 2. In the form shown, the vertical guide wall 3 is made integral with the table and is inclined to the path of movement of the fish at the angle of 43° described above. Mounted on the table is a vertical bracket 4 which extends horizontally at 5 over the loading position and is provided at its end with an indicating pin or finger 6 which overlies the correct position for the eye of the fish as shown in Fig. 1. If desired, a stop plate 7 may be provided as a safety device in case the operator slides the body of the fish beyond the correct position determined by the pin 6.

The table top is provided with a suitable number of spaced parallel longitudinal slots 8 which are continued at 9 in the vertical back wall 3. These slots permit a set of pushing elements 10 to emerge through the vertical wall 3 and to travel along the table. These pushing elements are adjusted to form the same angle relative to the path of movement of the fish as the vertical wall 3, so that they move the body of the fish away from the vertical wall and off of the table 2 without shifting its lateral position or its angle of inclination. The leading edges of the pushing elements are preferably provided with pointed projections as shown in Figs. 5 and 6 or are otherwise suitably formed to minimize the possibility of shifting of the fish body.

The pushing elements 10 are mounted on and form part of a moving conveyor which supports the body of the fish after it leaves the table and carries it to the cutting knife without subjecting it to any frictional or other force which might alter its position with respect to the knife. In the form shown this conveyor comprises a series of endless chains 11 running around sprockets 12 and 13 and sufficiently close together to support the fish body properly. Either the sprockets 12 or 13 may be driven in any suitable manner; as shown, the sprockets 13 are driven by a sprocket gear 14, chain 15 and sprocket gear 16 on a shaft 17. Shaft 17 is in turn driven by gears 18 and 19 and motor 20 mounted on the lower part of the frame 1.

The upper reaches of the chains are supported by and slide on rails 21 which preferably extend substantially the entire distance between the sprockets 12 and 13. Sets of pushing elements 10 are mounted on the chain links at intervals spaced with respect to the speed of movement of the chains to allow suitable loading intervals.

The cutting knife may be of any suitable type and as shown comprises a circular rotating blade 22 mounted on a laterally extending shaft 23 which is driven by the motor 20 in any suitable manner as by means of the chain 24. As the fish passes the edge of the knife and is cut in two, guides 25 deflect the portions of the fish body away from the knife after which they are carried to separate discharge chutes 26 at the end of the machine. The guides 25 may suitably be mounted on the two rails 21 between which the knife rotates.

Owing to the substantially constant distance between the eye of the fish and the desired cutting point, the indicating finger can be adjusted so that the machine cuts closely to the ideal line and thus provides a maximum yield of useful material regardless of variations in the size of the individual fish. Moreover, the eye of the fish is an easily visible mark which can be located rapidly and accurately beneath the indicating finger, and with the aid of the stationary loading platform and the vertical inclined guide wall, the operator can place the fish rapidly and precisely in the correct position unhindered by any moving parts. The body of the fish is then moved off the table without disturbing its position, after which it is carried to and past the cutting knife by the moving conveyor without being subjected to any frictional or other forces which would tend to disturb its position. These means enable the operator to maintain an even rapid flow of fish through the machine and at the same time to maintain all of the advantages of accurate location of the fish as described above.

While only one embodiment of the invention has been described and illustrated in the drawings, it is to be expressly understood that the invention is not restricted to this embodiment and that various changes may be made in form, details of construction and arrangement of the parts without departing from the spirit of the invention. Reference is therefore to be had to the appended claims for a definition of the limits of the invention.

What is claimed is:

1. A fish heading machine comprising a loading station, a cutting knife, and means for conveying fish from said loading station to said knife, said loading station comprising a stationary vertical means for determining the position of a fish placed in said machine, said position determining means being inclined to the direction of movement of the conveying means at an angle corresponding to the desired angle between the line of cut and the body of the fish, and an indicating device denoting the desired position of the eye of the fish when it is placed against said position determining means by the operator, said indicating device being spaced from said cutting knife in a direction transverse to said direction of movement by an amount correspoding to the distance between the eye of the fish and the desired cutting point.

2. A fish heading machine comprising a loading station, a cutting knife, and means for conveying fish from said loading station to said knife, said loading station comprising a stationary vertical means for determining the position of a fish placed in said machine, said position determining means being inclined to the direction of movement of the conveying means at an angle corresponding to the desired angle between the line of cut and the body of the fish, and an elevated pointer device located above the position to be occupied by the eye of the fish when it is placed against said position determining means by the operator, said pointer device being spaced from said cutting knife in a direction transverse to said direction of movement by an amount equal to the transverse component of the distance between the eye of the fish and the desired cutting point at the angle of inclination of the fish as determined by said positioning means.

3. A fish heading machine comprising a stationary loading platform, a cutting knife, conveying means for carrying fish from said platform to said knife, a stationary vertical means for determining the position of a fish placed in said machine, said position determining means projecting above said platform and being inclined to the direction of movement of said conveying means at an angle corresponding to the desired angle between the line of cut and the body of the fish, an indicating device denoting the desired lateral position of the eye of the fish when placed on said platform against said position determining means, and means for moving fish from said platform to said conveying means without altering their angular and lateral positions.

4. A fish heading machine comprising a stationary loading platform, a cutting knife, conveying means for carrying fish from said platform to said knife, a vertical stop wall projecting above said platform and inclined to the direction of movement of said conveying means at an angle corresponding to the desired angle between the line of cut and the body of the fish, an indicating device denoting the desired lateral position of the eye of the fish when placed on said platform against said stop wall, said platform and stop wall having aligned horizontal and vertical slots respectively which extend parallel to said direction of movement, and pusher elements movable through said slots and aligned parallel to said stop wall for moving the body of a fish from said platform to said conveying means.

5. A fish heading machine comprising a stationary loading platform, a cutting knife, conveying means movable under and beyond said platform to said knife, a vertical stop wall projecting above said platform and inclined to the direction of movement of said conveying means at an angle corresponding to the desired angle between the line of cut and the body of the fish, an indicating device denoting the desired lateral position of the eye of the fish when placed on said platform against said stop wall, said platform and stop wall having aligned horizontal and vertical slots respectively which extend parallel to said direction of movement, and pusher elements projecting upwardly from said conveying means through said slots and aligned parallel to said stop wall for moving fish off said table onto said conveying means, said conveying means supporting the fish out of contact with other parts of the machine, and carrying them from the table to the knife.

6. A fish heading machine comprising a stationary loading platform, a cutting knife, conveying means movable under and beyond said platform to said knife, a vertical stop wall projecting above said platform and inclined to the direction of movement of said conveying means at an angle corresponding to the desired angle between the line of cut and the body of the fish, an indicating device denoting the desired lateral position of the eye of the fish when placed on said platform against said stop wall, said platform and stop wall having aligned horizontal and vertical slots respectively which extend parallel to said direction of movement, said conveying means comprising a plurality of endless chains having fingers projecting upwardly through said slots and aligned parallel to said stop wall for moving fish off said table onto said chains, and rails supporting said chains intermediate the table and knife, the fish being supported on said chains out of contact with other parts of the machine and thus carried to the knife.

FRED PARSONS BROWN.

REFERENCES CITED

The following references are of record in the file of this patent:

UNITED STATES PATENTS

| Number | Name | Date |
| --- | --- | --- |
| 1,909,643 | Waugh | May 16, 1933 |
| 2,010,882 | Ocenasek | Aug. 13, 1935 |
| 2,288,010 | Meland | June 20, 1942 |
| 1,332,477 | Sturm | Mar. 2, 1920 |

FOREIGN PATENTS

| Number | Country | Date |
| --- | --- | --- |
| 515,764 | Great Britain | Dec. 13, 1939 |